United States Patent
Aggarwal et al.

(10) Patent No.: US 11,048,867 B2
(45) Date of Patent: Jun. 29, 2021

(54) SYSTEM AND METHOD FOR EXTRACTING TABULAR DATA FROM A DOCUMENT

(71) Applicant: Wipro Limited, Bangalore (IN)

(72) Inventors: Amit Aggarwal, Najafgarh (IN); Krishna Prasad Yellapragada, Hyderabad (IN); Veena Srikanth Raje Urs, Bangalore (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 16/674,054

(22) Filed: Nov. 5, 2019

(65) Prior Publication Data

US 2021/0073326 A1     Mar. 11, 2021

(30) Foreign Application Priority Data

Sep. 6, 2019     (IN) .............................. 201941036021

(51) Int. Cl.
*G06F 40/177*     (2020.01)
*G06K 9/00*     (2006.01)

(52) U.S. Cl.
CPC ....... *G06F 40/177* (2020.01); *G06K 9/00449* (2013.01); *G06K 9/00456* (2013.01); *G06K 9/00463* (2013.01)

(58) Field of Classification Search
CPC .............. G06F 40/177; G06K 9/00456; G06K 9/00463; G06K 9/00449
USPC ....................................................... 715/227
See application file for complete search history.

(56) References Cited

U.S. PATENT DOCUMENTS

| | | | | |
|---|---|---|---|---|
| 5,737,442 A | * | 4/1998 | Alam ................. | G06K 9/00449 382/175 |
| 2001/0016856 A1 | * | 8/2001 | Tsuji ....................... | G06F 3/043 715/222 |
| 2006/0104511 A1 | * | 5/2006 | Guo .................... | G06K 9/00469 382/176 |
| 2007/0140565 A1 | * | 6/2007 | Lin .................... | G06K 9/00449 382/203 |

(Continued)

OTHER PUBLICATIONS

Apache; Class PDF Textstripper; <https://pdfbox.apache.org/docs/2.0.7/javadocs/org/apache/pdfbox/text/PDFTextStripper.html>; published prior to Apr. 19, 2019 (Year: 2019).*

(Continued)

*Primary Examiner* — Stephen S Hong
*Assistant Examiner* — Broderick C Anderson
(74) *Attorney, Agent, or Firm* — Finnegan, Henderson, Farabow, Garrett & Dunner, LLP

(57) ABSTRACT

The present invention relates to a method for extracting tabular data from a document. The method includes identifying a bordered table or a borderless table in a received document and an image of the document. The tabular data in the identified bordered table is extracted using a first and a second set of pixel coordinates from the plurality of pixel coordinates. Further, upon identifying the borderless table in the document, a first set of document coordinates of at least one row of the borderless table is determined. Furthermore, a second set of document coordinates of the at least one column corresponding to the at least one row is determined. Finally, the tabular data in the identified borderless table is extracted from the document based on the determined first and second set of document coordinates.

18 Claims, 12 Drawing Sheets

(56) References Cited

U.S. PATENT DOCUMENTS

| | | | |
|---|---|---|---|
| 2013/0191715 A1* | 7/2013 | Raskovic | G06F 40/177 |
| | | | 715/227 |
| 2013/0191732 A1 | 7/2013 | Lazarevic et al. | |
| 2015/0128019 A1* | 5/2015 | Ohmori | G06K 9/00402 |
| | | | 715/227 |
| 2016/0055376 A1* | 2/2016 | Koduru | G06F 40/14 |
| | | | 382/176 |
| 2016/0104077 A1 | 4/2016 | Jackson, Jr. et al. | |
| 2018/0373952 A1* | 12/2018 | Bui | G06Q 10/10 |
| 2019/0005322 A1* | 1/2019 | Tripathi | G06K 9/00463 |

OTHER PUBLICATIONS

Pinto, D. et al, "Table Extraction Using Conditional Random Fields", Sigir 2003, 8 pages.

* cited by examiner

|   | 0 | 1 | 2 | 3 | 4 | 5 | 6 | 7 |
|---|---|---|---|---|---|---|---|---|
| 0 | T | H | I | S |   | I | S |   |
| 1 | A |   | S | A | M | P | L | E |
| 2 | T | E | X | T | . |   |   |   |

This is an example document containing a sample text. The table below indicates a list of employees of an organization. The table below has the first name, last name and email id of the employees.

| SL NO. | FIRST NAME | LAST NAME | EMAIL |
|---|---|---|---|
| 1 | Clark | Kent | clarkkent@mail.com |
| 2 | John | Carter | johncarter@mail.com |
| 3 | Peter | Parker | peterparker@mail.com |

TABLE - 1

FIGURE 4A

| SL NO. | FIRST NAME | LAST NAME | EMAIL |
|---|---|---|---|
| 1 | Clark | Kent | clarkkent@mail.com |
| 2 | John | Carter | johncarter@mail.com |
| 3 | Peter | Parker | peterparker@mail.com |

| | 200, 650 | 300, 650 | 400, 650 | 102 500, 650 |
|---|---|---|---|---|
| 100, 650 / 100, 750 | SL NO. | FIRST NAME | LAST NAME | EMAIL | 500, 750 |
| 100, 850 | 1 | Clark | Kent | clarkkent@mail.com | 500, 850 |
| 100, 950 | 2 | John | Carter | johncarter@mail.com | 500, 950 |
| 100, 1050 | 3 | Peter | Parker | peterparker@mail.com | |
| | 200, 1050 | 300, 1050 | 400, 1050 | 500, 1050 |

FIGURE 4C

| 100 = 1.5 cm | 200 = 3 cm | 300 = 4.5 cm | 400 = 6 cm | 500 = 7.5 cm |
| 650 = 9.75 cm | 750 = 11.25 cm | 850 = 12.75 cm | 950 = 14.25 cm | 1050 = 15.75 cm |

This is an example document containing a sample text. The table below indicates a list of products with the product ID, name and the quantity ordered for purchasing.

| Product ID | Product Name | Product Quanity |
|---|---|---|
| P-001 | Mango | 105 Dozen |
| P-002 | Apple | 35 Kgs |
| P-003 | Oranges | 55 Kgs |
| P-004 | Strawberries | 15 Kgs |

TABLE - 2

FIGURE 6A

| Product ID | Product Name | Product Quanity |
|---|---|---|
| P-001 | Mango | 105 Dozen |
| P-002 | Apple | 35 Kgs |
| P-003 | Oranges | 55 Kgs |
| P-004 | Strawberries | 15 Kgs |

TABLE - 2

FIGURE 6B

| Product ID | Product Name | Product Quanity | |
|---|---|---|---|
| P-001 | Mango | 105 Dozen | |
| P-002 | Apple | 35 Kgs | ╱ 103 |
| P-003 | Oranges | 55 Kgs | |
| P-004 | Strawberries | 15 Kgs | |

FIGURE 6C

| | Product ID | Product Name | Product Quanity | |
|---|---|---|---|---|
| 9.75 cm | | | | |
| 11.25cm | P-001 | Mango | 105 Dozen | |
| 12.75 cm | P-002 | Apple | 35 Kgs | ╱ 103 |
| 14.25 cm | P-003 | Oranges | 55 Kgs | |
| 15.75 cm | P-004 | Strawberries | 15 Kgs | |

FIGURE 6D

| 9.75 cm = 650 | 11.25cm = 750 | 12.75 cm = 850 | 14.25 cm = 950 | 15.75 cm =1050 |

FIGURE 6E

| Product ID | Product Name | Product Quanity | |
|---|---|---|---|
| 100 | 200 | 300 | |
| P-001 | Mango | 105 Dozen | |
| P-002 | Apple | 35 Kgs | 103 |
| P-003 | Oranges | 55 Kgs | |
| P-004 | Strawberries | 15 Kgs | |

FIGURE 6F

| 100 = 1.5 cm | 200 = 3 cm | 300 = 4.5 cm |
|---|---|---|

FIGURE 6G

SYSTEM AND METHOD FOR EXTRACTING TABULAR DATA FROM A DOCUMENT

TECHNICAL FIELD

The present disclosure relates to the field of information retrieval. Particularly, but not exclusively, the present disclosure relates to method for extracting tabular data from a document.

BACKGROUND

Generally, a Portable document format (PDF) file is used to store data because of the enhanced security mechanism provided by the PDF file. For extracting data from the PDF files, the PDF files needs to be processed, stored and transformed into a computer readable data. The extracted data from the PDF files needs to be subjected for further processing for determining the content of the extracted data. Often data has to be extracted from the PDF files or any such documents. The data extraction may be essential for completion of technical tasks for example handling insurance claims, processing health records and the like. The data in the PDF files may include a text in a paragraph, an image, a plurality of tables for providing visual grouping of information. The plurality of tables may include a bordered table and a borderless table. The data from the bordered table may be extracted based on the bordered lines of the bordered table.

Few documents may not visually provide a table (a table having borders may not be provided) however, the contents may be grouped in a tabular format (data can be arranged in a tabular form without border). An issue with the existing data extraction techniques is the lack of ability to identify a borderless table in a document. Thus, existing documents scanning systems cannot be used for extracting tabular content not having a border.

The information disclosed in this background of the disclosure section is only for enhancement of understanding of the general background of the invention and should not be taken as an acknowledgement or any form of suggestion that this information forms the prior art already known to a person skilled in the art.

SUMMARY

Additional features and advantages are realized through the techniques of the present disclosure. Other embodiments and aspects of the disclosure are described in detail herein and are considered a part of the claimed disclosure.

Disclosed herein is a method for extracting tabular data from a document, the method includes receiving the document and an image of the document, wherein the image comprises a plurality of pixel coordinates. Further, the method includes identifying at least one of a bordered table and a borderless table in the document using the image of the document. Furthermore, upon identifying the bordered table in the document, the method includes extracting tabular data in the identified bordered table using a first and a second set of pixel coordinates from the plurality of pixel coordinates, wherein the first and the second set of pixel coordinates corresponds to at least one row and at least one column in the image of the document respectively. Thereafter, upon identifying the borderless table in the document, the method includes determining a first set of document coordinates of at least one row of the borderless table by distinguishing the at least one row with at least one non-tabular row in the document. Subsequently, determining a second set of document coordinates of the at least one column corresponding to the at least one row, based on the second set of pixel coordinates of the at least one column. Finally, extracting the tabular data in the identified borderless table from the document based on the determined first and second set of document coordinates.

Embodiments of the present disclosure discloses a tabular data extraction system, for extracting tabular data from a document, the tabular data extraction system includes a processor and a memory communicatively coupled to the processor, wherein the memory stores the processor executable instructions, which, on execution, causes the processor to receive the document and an image of the document, wherein the image comprises a plurality of pixel coordinates. Further the processor is configured to identify at least one of a bordered table and a borderless table in the document using the image of the document. Furthermore, upon identifying the bordered table in the document the processor is configured to extract the tabular data in the identified bordered table using a first and a second set of pixel coordinates from the plurality of pixel coordinates, wherein the first and the second set of pixel coordinates corresponds to at least one row and at least one column in the image of the document respectively. Thereafter, upon identifying the borderless table in the document, the processor is configured to determine a first set of document coordinates of at least one row of the borderless table by distinguishing the at least one row with at least one non-tabular row. Subsequently, the processor is configured to determine a second set of document coordinates of the at least one column corresponding to the at least one row, based on the second set of pixel coordinates of the at least one column. Finally, the processor is configured to extract the tabular data in the identified borderless table from the document based on the determined first and second set of document coordinates.

Embodiments of the present disclosure discloses a non-transitory computer readable medium including instructions stored thereon that when processed by at least one processor cause a device to perform operations including identifying at least one of a bordered table and a borderless table in the document using the image of the document. Furthermore, upon identifying the bordered table in the document, the method includes extracting tabular data in the identified bordered table using a first and a second set of pixel coordinates from the plurality of pixel coordinates, wherein the first and the second set of pixel coordinates corresponds to at least one row and at least one column in the image of the document respectively. Thereafter, upon identifying the borderless table in the document, the method includes determining a first set of document coordinates of at least one row of the borderless table by distinguishing the at least one row with at least one non-tabular row in the document. Subsequently, determining a second set of document coordinates of the at least one column corresponding to the at least one row, based on the second set of pixel coordinates of the at least one column. Finally, extracting the tabular data in the identified borderless table from the document based on the determined first and second set of document coordinates.

The foregoing summary is illustrative only and is not intended to be in any way limiting. In addition to the illustrative aspects, embodiments, and features described above, further aspects, embodiments, and features may become apparent by reference to the drawings and the following detailed description.

BRIEF DESCRIPTION OF THE ACCOMPANYING DRAWINGS

The novel features and characteristic of the disclosure are set forth in the appended claims. The disclosure itself, however, as well as a preferred mode of use, further objectives and advantages thereof, may best be understood by reference to the following detailed description of an illustrative embodiment when read in conjunction with the accompanying drawings. The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. One or more embodiments are now described, by way of example only, with reference to the accompanying figures wherein like reference numerals represent like elements and in which:

FIG. 4A shows an exemplary document with a bordered table, in accordance with some embodiments of the present disclosure;

FIG. 4B is an exemplary illustration of determining a bordered table in a document, in accordance with some embodiments of the present disclosure;

FIG. 4C is an exemplary illustration of determining a first and second set of pixel coordinates of a bordered table in a document, in accordance with some embodiments of the present disclosure;

FIG. 6A shows an exemplary document with a borderless table, in accordance with some embodiments of the present disclosure;

FIG. 6B is an exemplary illustration of identifying a borderless table from a document, in accordance with some embodiments of the present disclosure;

FIG. 6C shows an exemplary table header distinguished from the borderless table, in accordance with some embodiments of the present disclosure;

FIG. 6D is an exemplary illustration of determining first set of document coordinates of a borderless table, in accordance with some embodiments of the present disclosure;

FIG. 6E is an exemplary illustration of converting the first set of document coordinates to first set of pixel coordinates, in accordance with some embodiments of the present disclosure;

FIG. 6F shows an exemplary illustration of identifying second set of pixel coordinates of the borderless table, in accordance with some embodiments of the present disclosure;

FIG. 6G shows an exemplary illustration of converting second set of pixel coordinates to second set of document coordinates, in accordance with some embodiments of the present disclosure.

Figure 1:
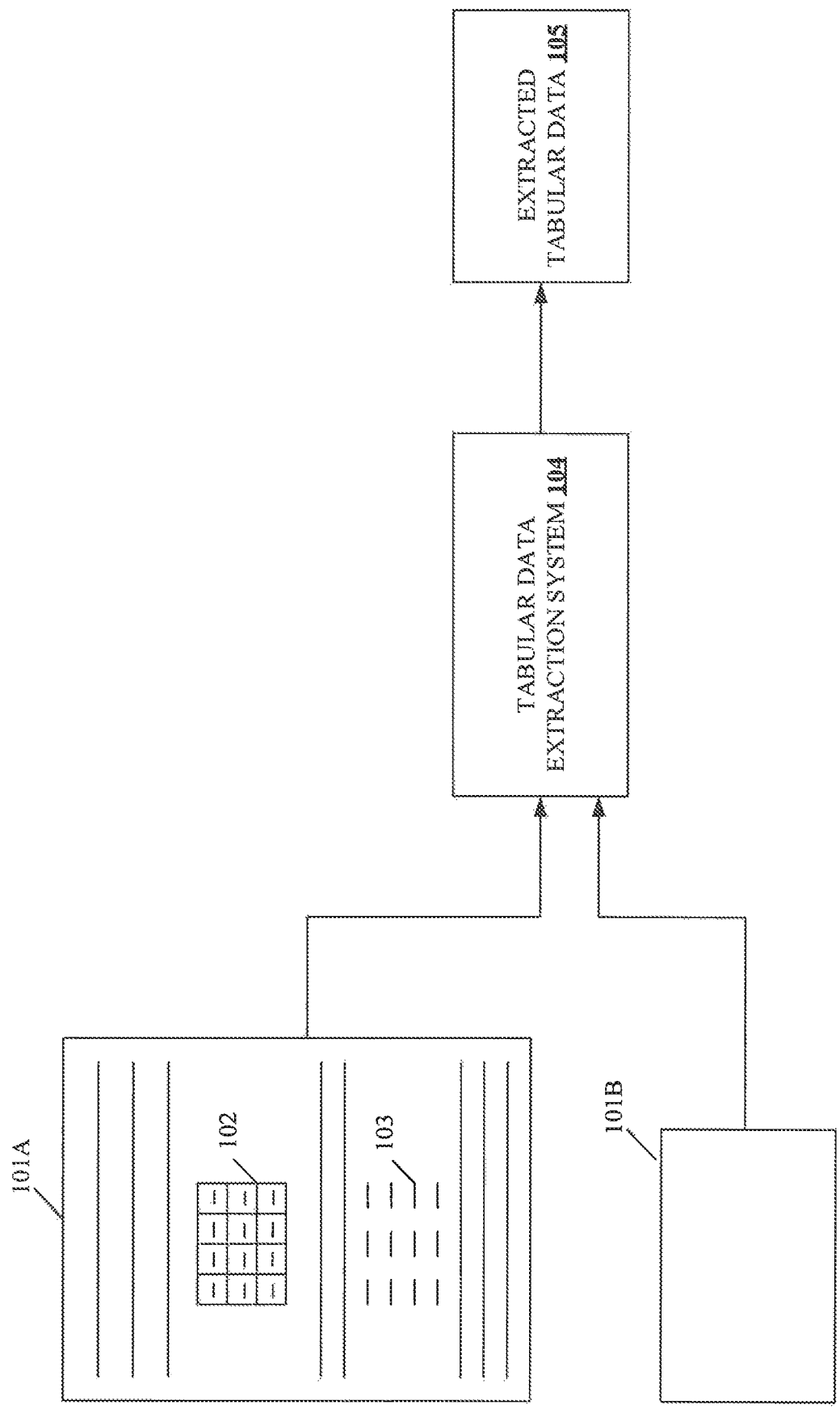
FIG. 1 shows an exemplary environment for extracting tabular data from a document, in accordance with some embodiments of the present disclosure.

It should be appreciated by those skilled in the art that any block diagrams herein represent conceptual views of illustrative systems embodying the principles of the present subject matter. Similarly, it may be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and may be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "includes" "comprising", "including" or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" or "includes . . . a" does not, without more constraints, preclude the existence of other elements or additional elements in the system or apparatus.

The present disclosure describes a method for extracting tabular data from a document. The document and the image of the document may be received from an input source. Initially, the category of the table as a bordered table and a borderless table may be identified using image processing techniques. Upon detecting a bordered table, a first and second set of pixel coordinates of at least one table row and at least one table column may be retrieved from the image of the document, based on a plurality of detected borders in the image of the document. The tabular data from the bordered table may be extracted based on the converted first and second set of document coordinates from the first and second set of pixel coordinates. Upon detecting a borderless table, a first set of document coordinates of at least one row may be determined by distinguishing the at least one row with at least one non-tabular row and a second set of document coordinates of the at least one column may be determined based on the second set of pixel coordinates of the at least one column. Further, the tabular data may be extracted from borderless table based on the first and second set of document coordinates. The extracted tabular data may be stored and transformed into a computer readable form.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows an exemplary environment for extracting tabular data from a document, in accordance with some embodiments of the present disclosure.

In an embodiment, a document (101A) and an image (101B) of the document (101A) may be received by a tabular data extraction system (104). In one embodiment, the tabular data extraction system (104) may be a document scanner. The document scanner may have a built-in imaging unit such as a camera to capture the image of the document and process the image. Further, the document scanner may also receive the document via a communication channel. In another embodiment, the tabular data extraction system (104) may be a computing device that is capable of receiving the document (101A) and the image of the document (101A). The tabular data extraction system (104) may receive the document (101A) and the image (101B) of the document (101A) from a plurality of input sources for example a memory unit, an universal serial bus (USB) device, a remote server, one or more Internet of Things (IoT) devices, a smartphone, and the like. The plurality of input sources may be connected to the tabular data extraction system (104) using at least one of a wired or a wireless interface. The document (101A) may be received by the tabular data extraction system (104) as a file in one or more formats for example a Portable Document Format (PDF) file, Encapsulated Postscript (EPS) and the like. The image (101B) of the document (101A) may be received by the tabular data extraction system (104) as a file in one or more formats for example Joint Photographic Experts Group (JPEG), Portable Network Graphics (PNG), Graphics Interchange Format (GIF), Tagged Image File (TIFF) and the like.

The document (101A) may include at least one of a paragraph of text, a bordered table (102), a borderless table (103) and the like. The bordered table (102) may include a border around data present in the table. For example, in an Excel document, the cells may act as the bordered table (102). In a Word document, a dedicated table having borders may be inserted. The borders around the cells of the bordered table (102) may distinguish one row of the bordered table (102) with the adjacent rows of the bordered table (102) and distinguishes one column of the bordered table (102) with the adjacent columns of the bordered table (102).

In case of the borderless table (103), information may be structured in a form of a table comprising a plurality of rows and columns, where borders around the cells of a table may be absent as shown in FIG. 1. The data extraction system (104) may identify at least one of the bordered table (102) and the borderless table (103) in the document (101A) using the image (101B) of the document (101A). The data extraction system (104) may detect the presence of borders using one or more image processing techniques for example edge detection to identify the bordered table (102) and detect the absence of borders to identify the borderless table (103). The data extraction system (104) upon identifying the bordered table (102) in the document (101A), may extract the tabular data in the identified bordered table (102) using a first and a second set of pixel coordinates from the plurality of pixel coordinates. The first and the second set of pixel coordinates corresponds to at least one row and at least one column in the image (101B) of the document (101A) respectively. The image (101B) of the document (101A) may be represented as a matrix of dimension (m×n), where 'm' indicates the number of rows in the matrix and 'n' indicates the number of columns in the matrix. Every value in the matrix of (m×n) represents the pixel value of the image (101B). For example, if the image has a resolution of 1080×1020, then the matrix representing the image may have the dimension 1080×1020 (m×n) and a total of 1,101 A, 600-pixels in the matrix. For example, the pixel value may be intensity, brightness, hue, saturation and the like. A pixel coordinate among the plurality of pixel coordinates may be a number or a pair of numbers used for identifying the location of a pixel in the image. The pixel coordinate may be represented using at least one of a cartesian coordinate system, a polar coordinate system and the like. For example, using the cartesian coordinate system the pixel coordinate of a pixel may be represented as pair of numbers [i,j], where the number "i" indicates the row number and "j" indicates the column number of the corresponding pixel.

The tabular data extraction system (104), upon identifying the borderless table (103) in the document (101A), may determine a first set of document coordinates of at least one row of the borderless table (103) by distinguishing the at least one row with at least one non-tabular row. Further, the tabular data extraction system (104) may determine a second set of document coordinates of the at least one column corresponding to the at least one row, based on the second set of pixel coordinates of the at least one column. In an embodiment, the document coordinates may include at least one of one or more distances from a reference point in a page of the document (101A), line numbers in the page of the document (101A) and column numbers in the page of the document (101A). For example, using the reference point as the top left corner of the page in the image (101B) of the document (101A), the document coordinates may be represented as 1.2 cm in x direction and 5 cm in the y direction using the one or more distances. Finally, the tabular data extraction system (104) extracts the tabular data in the identified borderless table (103) from the document (101A) based on the determined first and second set of document coordinates. The tabular data may be extracted from the identified bordered table (102) and borderless table (103) using the text processing libraries for example a pdfbox library and the like. The extracted tabular data (105) may be stored in a sorted format and transformed into a computer readable format.

In an embodiment, the tabular data extraction system (104) may be hosted on at least one of a server, a smartphone, a computer system and the like.

In an embodiment, the tabular data extraction system (104) may create a copy of the received document (101A) in an image format by way of converting the document (101A) into image of the document (101A).

Figure 2A:
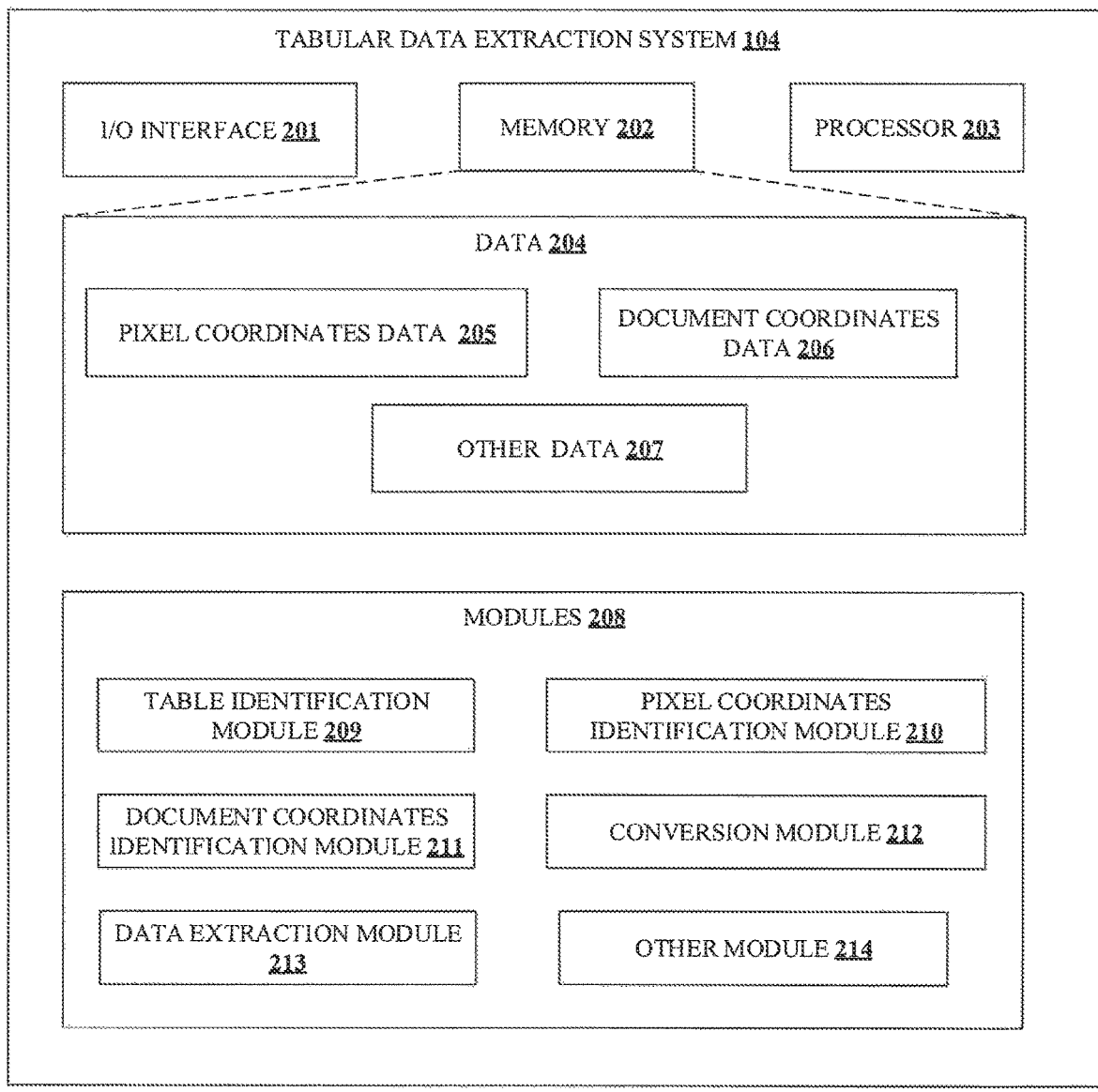
FIG. 2A shows a detailed block diagram of a tabular data extraction system, in accordance with some embodiments of the present disclosure.

FIG. 2A shows a detailed block diagram of the tabular data extraction system (104), in accordance with some embodiments of the present disclosure.

The tabular data extraction system (104) may include a Central Processing Unit ("CPU" or "processor") (203) and a memory (202) storing instructions executable by the processor (203). The processor (203) may include at least one data processor for executing program components for executing user or system-generated requests. The memory (202) may be communicatively coupled to the processor (203). The tabular data extraction system (104) further includes an Input/Output (I/O) interface (201). The I/O interface (201) may be coupled with the processor (203) through which an input signal or/and an output signal may be communicated. In one embodiment, the tabular data extraction system (104) may receive the document (101A) and the image (101B) of the document (101A) through the I/O interface (201).

In some implementations, the tabular data extraction system (104) may include data (204) and modules (208). As an example, the data (204) and modules (208) may be stored in the memory (202) configured in the tabular data extraction system (104) as shown in the FIG. 2A. In one embodiment, the data (204) may include, for example, a pixel coordinates data (205), document coordinates data (206), and other data (207). In the illustrated FIG. 2A, data (204) are described herein in detail.

Figure 2B:
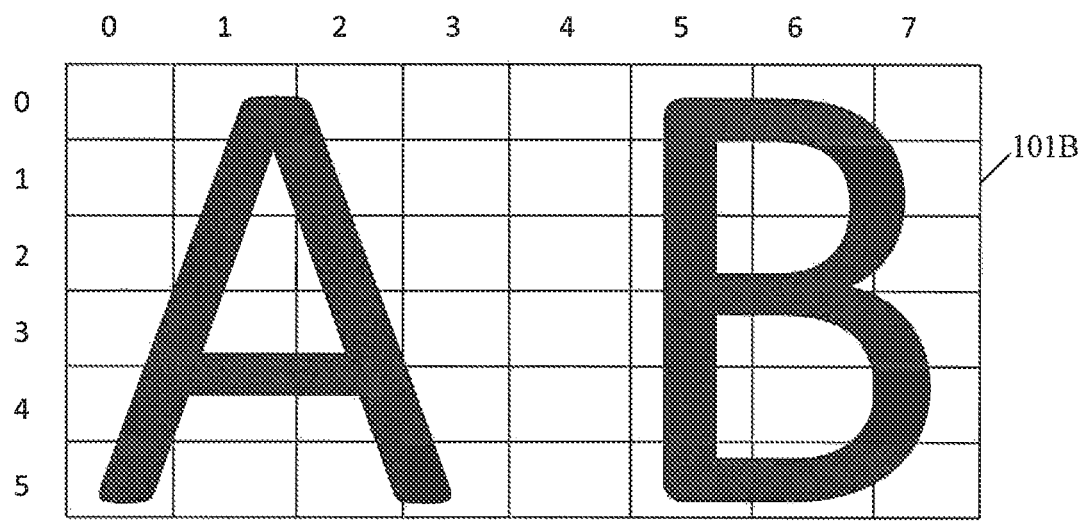
FIG. 2B shows an exemplary image of a document with pixel coordinates, in accordance with some embodiments of the present disclosure.

In an embodiment, the pixel coordinates data (205) may include location information of all the pixels in the image (101B) of the document (101A). The image (101B) of the document (101A) may be represented as a matrix of dimension (m×n), where 'm' indicates the number of rows in the matrix and 'n' indicates the number of columns in the matrix. Every value in the matrix of (m×n) represents the pixel value in the image. The location information of the pixel may be represented using at least one of a pixel coordinates and spatial coordinates. FIG. 2B shows the pixel coordinates of an image (101B) having a plurality of rows numbered from 0 to 5 and a plurality of columns numbered from 0 to 7. For pixel coordinates, considering reference pixel (0,0) from the left-top row of the image, the plurality of rows increases downward and the plurality of columns increases to the right. The pixel coordinates may be integer values and range from 0 to the length of the plurality of rows and plurality of columns. Further, the pixel coordinates data (205) may include a first set of pixel coordinates and a second set of pixel coordinates. The first set of pixel coordinates may correspond to at least one row of the bordered table (102) or a borderless table (103). The second set of pixel coordinates may correspond to at least on column of the bordered table (102) or the borderless table (103).

Figures 2C, 2D:
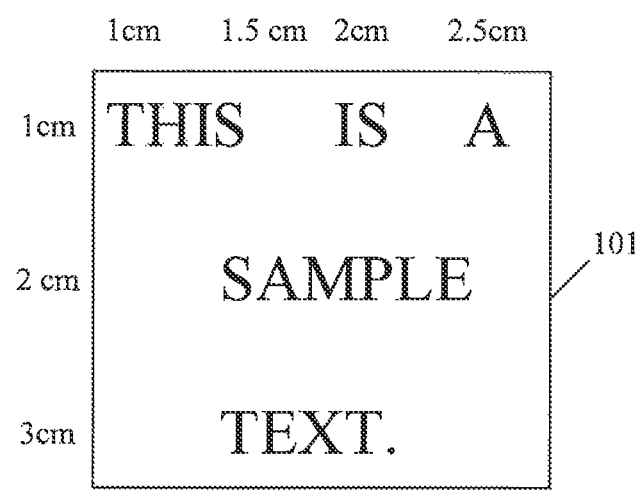
FIG. 2C shows an exemplary first and second set of document coordinates of a document using line numbers and column numbers, in accordance with some embodiments of the present disclosure.
FIG. 2D shows an exemplary first and second set of document coordinates of a document using distance, in accordance with some embodiments of the present disclosure.

In an embodiment, the document coordinates data (206) may include a first set of document coordinates and a second set of document coordinates. The first set of document coordinates may correspond to the at least one row of the bordered table (102) or the borderless table (103) in the document (101A). The second set of document coordinates may correspond to the at least one column of the bordered table (102) or the borderless table (103) in the document (101A). The document coordinates may be represented as at least one of one or more distances from a reference point in a page of the document (101A), line numbers in the page of the document (101A) and column numbers in the page of the document (101A). As shown in FIG. 2C, the document coordinates may be represented using line numbers numbered from 0 to 2 and column numbers numbered from 0 to 7 of the document (101A). As shown in FIG. 2D, the document coordinates may be represented using the one or more distances measured in centimeters (cm) using the top left corner of the document (101A) as the reference point in the page of the document (101A).

In an embodiment, the other data (210) may include the extracted tabular data (105), one or more parameters associated with a Long Short-Term Memory (LSTM) (501) based deep learning model and the like.

In some embodiments, the data (204) may be stored in the memory (202) in form of various data structures. Additionally, the data (204) may be organized using data models, such as relational or hierarchical data models. The other data (207) may store data, including temporary data and temporary files, generated by the modules (208) for performing the various functions of the tabular data extraction system (104).

In some embodiments, the data (204) stored in the memory (202) may be processed by the modules (208) of the tabular data extraction system (104). The modules (208) may be stored within the memory (202). In an example, the modules (208) may be communicatively coupled to the processor (203) configured in the navigation unit (200), may also be present outside the memory (202) as shown in FIG. 2A and implemented as hardware. As used herein, the term modules (208) may refer to an Application Specific Integrated Circuit (ASIC), a FPGA (Field Programmable Gate Array), an electronic circuit, a processor (shared, dedicated, or group) and memory (202) that execute one or more software or firmware programs, a combinational logic circuit, and/or other suitable components that provide the described functionality. In some other embodiments, the modules (208) may be implemented using at least one of ASICs and FPGAs.

In one implementation, the modules (208) may include, for example, a table identification module (209), a pixel coordinates identification module (210), a document coordinates identification module (211), a conversion module (212), a data extraction module (213), and other module (214). It may be appreciated that such aforementioned modules (208) may be represented as a single module or a combination of different modules.

In an embodiment, the table identification module (209) may be used to identify at least one of a bordered table (102) and a borderless table (103) in the document (101A) using the image (101B) of the document (101A). The bordered table (102) may be identified by the presence of borders around the cells of the bordered table (102) in the image (101B) of the document (101A). The absence of the borders may be used to identify the borderless table (103) in the image (101B) of the document (101A). The borders may be identified in the image (101B) of the document (101A) using one or more image processing techniques like line detection, edge detection, Hough transform, convolution-based techniques and the like.

In an embodiment, the pixel coordinates identification module (210) may be used to identify the first set of pixel coordinates corresponding to at least one row of the bordered table (102) in the image (101B) of the document (101A). Further, the pixel coordinates identification module (210) may be used to identify the second set of pixel coordinates corresponding to at least one column of the bordered table (102) and the borderless table (103) in the image (101B) of the document (101A). The pixel coordinates may be identified using the existing one or more image processing techniques.

In an embodiment, the document coordinates identification module (211) may be used to identify the first set of document coordinates corresponding to at least one row of the borderless table (103). Further, the document coordinates identification module (211) may be used to identify the second set of document coordinates corresponding to at least one column of the borderless table (103). The document coordinates identification module (211) may use Long Short-Term Memory (LSTM) (501) based deep learning model to identify the first set and second set of document coordinates.

In an embodiment, the conversion module (212) may be used to convert the first and the second set of pixel coordinates to first and second set of document coordinates. Further, the conversion module (212) may be used to convert the first and the second set of document coordinates to first and second set of pixel coordinates. For example, consider an image with 96 pixels per inch and 1 pixel approximately covers a distance of 0.02645 cm. Therefore, a pixel coordinate of (i,j) may be converted into document coordinates (r,c) using the equations given below:

$$r=i*0.02645 \qquad (1)$$

$$c=j*0.02645 \qquad (2)$$

Similarly, given the document coordinates (r,c) for an image with 96 pixels per inch and 1 cm including approximately 37.79 pixels, the pixel coordinates (i,j) may be determined using the equations given below:

$$i=r*37.79 \qquad (3)$$

$$j=c*37.79 \qquad (4)$$

In an embodiment, the data extraction module (213) may be used to extract the text data present in the identified bordered table (102) and the identified borderless table (103) in the document (101A). For example, the data may be extracted using a pdfbox library and the like. The pdfbox is an open-source Java™ library that supports the development and conversion of PDF documents. The extraction of the text from the document (101A) may be performed using the getText( ) method of the PDFTextStripper class.

In an embodiment, the other module (219) may be used to perform the one or more image processing techniques required extracting the image (101B) of the document (101A) from the received document (101A). Further, the other module may be used to perform at least one of a send, store and display the extracted tabular data (105).

Figure 3:
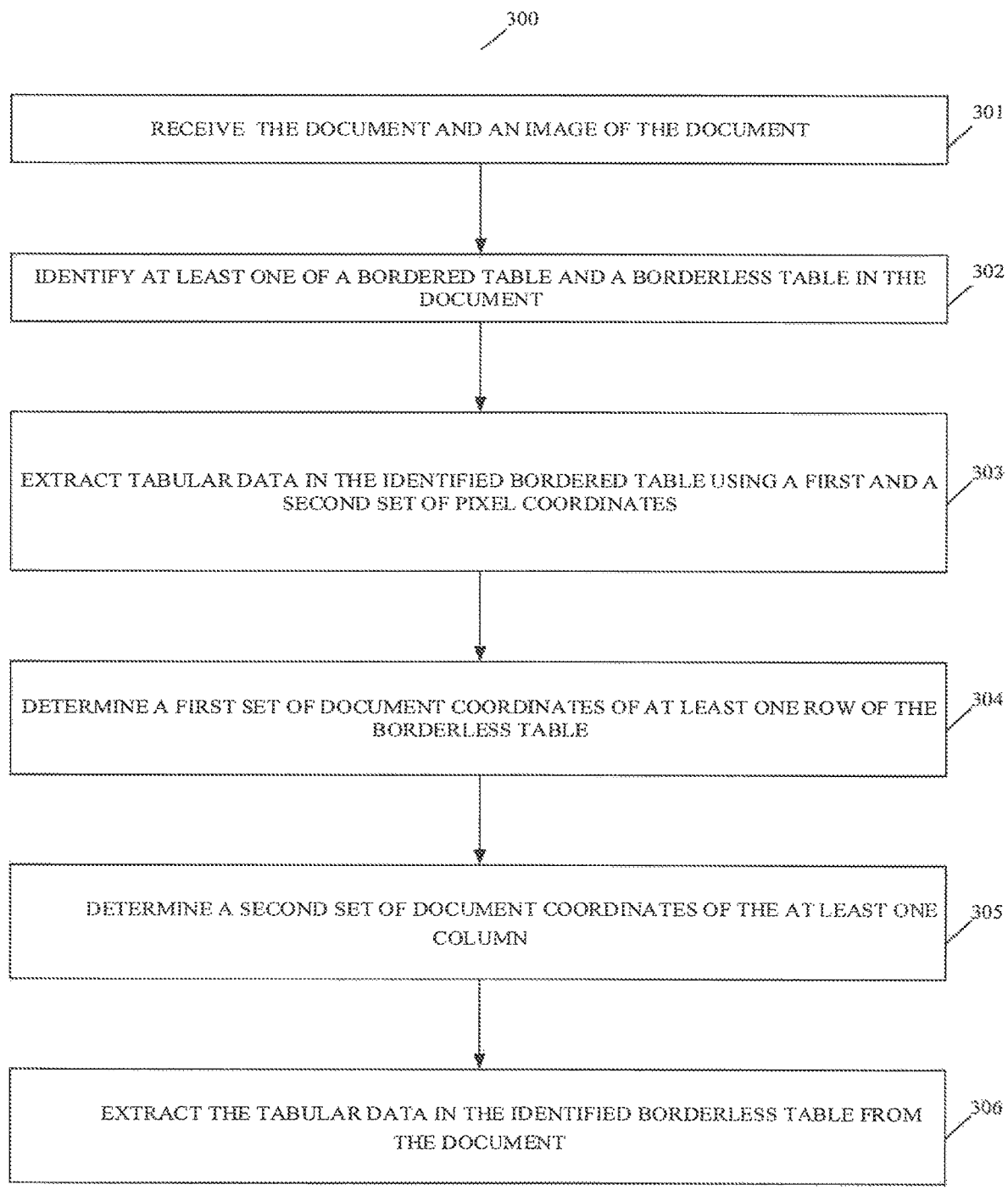
FIG. 3 shows a flowchart illustrating method steps for extracting data from a document, in accordance with some embodiment of the present disclosure.

FIG. 3 shows a flowchart illustrating method steps for extracting data from a document, in accordance with some embodiment of the present disclosure.

The order in which the method 300 may be described is not intended to be construed as a limitation, and any number of the described method blocks may be combined in any order to implement the method. Additionally, individual blocks may be deleted from the methods without departing from the scope of the subject matter described herein. Furthermore, the method may be implemented in any suitable hardware, software, firmware, or combination thereof.

At the step 301, the tabular data extraction system (104) may receive the document (101A) and an image (101B) of the document (101A) from a plurality of input sources for example a memory unit, an universal serial bus (USB) device, a remote server, one or more Internet of Things (IoT) devices, a smartphone, and the like. The plurality of input sources may be connected to the tabular data extraction system (104) using at least one of a wired or a wireless interface. The document (101A) may be received by the tabular data extraction system (104) as a file in or more formats for example a Portable Document Format (PDF) file, Encapsulated Postscript (EPS) and the like. The received document (101A) may include at least one of a text in the forms of a paragraph, a diagram, a flowchart, the bordered table (102), the borderless table (103) and the like. The received image (101B) of the document (101A) may be in one or more formats for example Joint Photographic Experts Group (JPEG), Portable Network Graphics (PNG), Graphics Interchange Format (GIF), Tagged Image File (TIFF) and the like.

In an embodiment, the tabular data extraction system (104) may convert the received document (101A) into the image (101B) of the document (101A).

At the step 302, the tabular data extraction system (104) may identify at least one of a bordered table (102) and a borderless table (103) in the document (101A) using the image (101B) of the document (101A). The tabular data extraction system (104) may identify at least one of the bordered table (102) and the borderless table (103) based on one or more image processing techniques applied on the image (101B) of the document (101A). The image processing techniques for example line detection, edge detection, Hough transform, convolution technique and the like may be used to detect the presence of borders in the image (101B) of the document (101A). The person skilled in the art may appreciate the use of one or more existing image processing techniques to identify the borders of a bordered table (102) in the image (106) of the document (101A). Based on the detected presence of borders in the image (101B) of the document (101A), the pixel coordinates of the bordered table (102) may be identified. The pixel coordinates of the identified bordered table (102) may include the pixels locations of the four corners of the bordered table (102) indicating the start and the end of the bordered table (102) in the image (101B) of the document (101A). Upon detecting the absence of borders the tabular data extraction unit (104) may identify the borderless table (103) in the image (106) of the document (101A).

At the step 303, the tabular data extraction system (104) upon identifying the bordered table (102) in the document (101A) may extract the tabular data in the identified bordered table (102) using a first and a second set of pixel coordinates from the plurality of pixel coordinates. The first and the second set of pixel coordinates corresponds to at least one row and at least one column in the image (101B) of the document (101A) respectively.

The tabular data extraction system (104) may retrieve the first and second set of pixel coordinates of the at least one row and the at least one column of the identified bordered table (102) based on one or more image processing techniques. The first set of pixel coordinates may correspond to the four corners of each row of the identified bordered table (102) in the image (101B) of the document (101A). The second set of pixel coordinates may correspond to the four corners of each column of the identified bordered table (102) in the image (101B) of the document (101A). Further, the retrieved first and the second set of pixel coordinates may be converted into the first and second set of document coordinates for example using the equations (1) and (2). Based on the converted first and second set of document coordinates the tabular data corresponding to the first and second set of document coordinates in the bordered table (102) is extracted from the document (101A) using a text processing library for example pdfbox in a sorted format.

Figures 4D, 5:
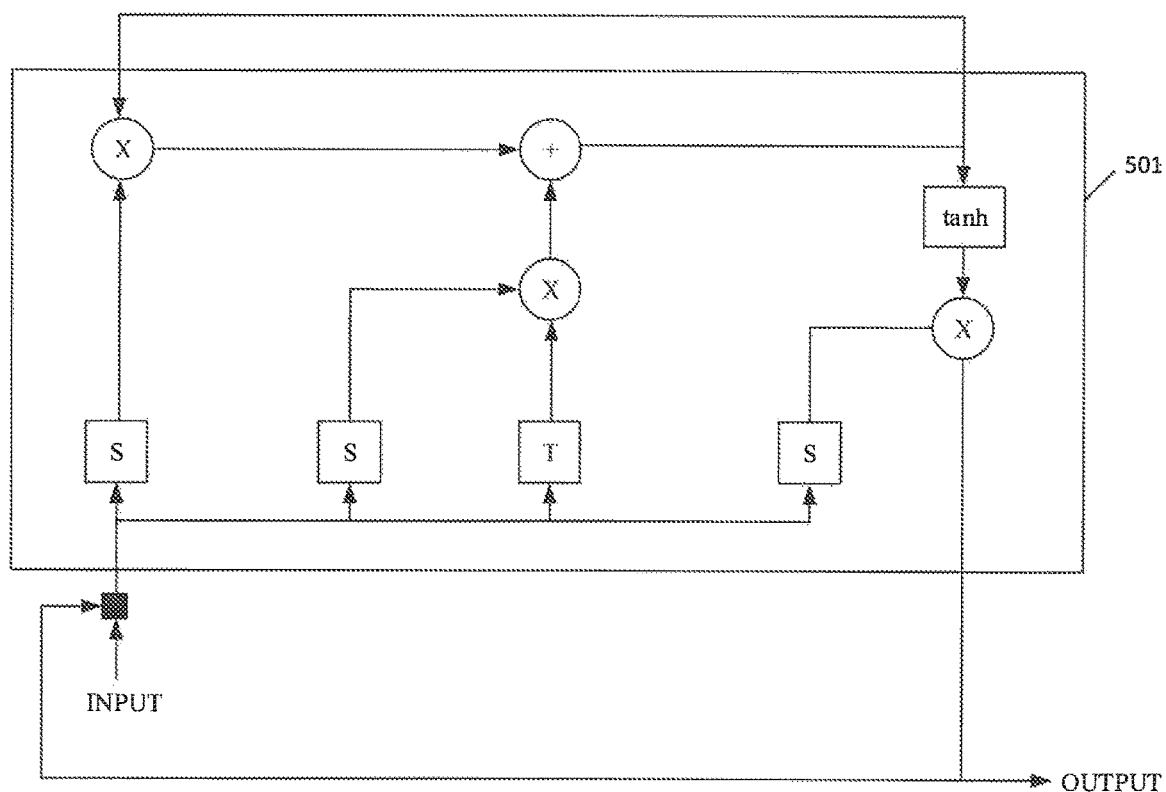
FIG. 4D is an exemplary illustration of deriving first and second set of document coordinates from the first and second set of pixel coordinates, in accordance with some embodiments of the present disclosure.
FIG. 5 shows an exemplary Long Short Term Memory (LSTM) based deep learning model, in accordance with some embodiments of the present disclosure.

As shown in FIG. 4A, the document (101A) with the bordered table (102) and the image (101B) of the document (101A) may be received by the tabular data extraction system (104). Further, the tabular data extraction system (104) may identify the bordered table (102) in the image (101B) of the document (101A) using the one or more existing image processing techniques as shown in FIG. 4B. Further, the tabular data extraction system (104) may retrieve the first and second set of pixel coordinates from the identified bordered table (102) using the image (101B) of the document (101A) as shown in FIG. 4C. The retrieved first and the second set of pixel coordinates may be converted into the first and second set of document coordinates as shown in FIG. 4D. Further, the tabular data extraction system (104) may extract the tabular data using the document coordinates from the document (101A) using a text processing library for example pdfbox and the like. In one embodiment, the data can be extracted from the image using the pixel coordinates. The image processing techniques may be applied to extract data from the image.

Referring back to FIG. 3, at the step 304, the tabular data extraction system (104) upon identifying the borderless table (103) in the document (101A) may determine a first set of document coordinates of at least one row of the borderless table (103) by distinguishing the at least one row with at least one non-tabular row.

The tabular data extraction system (104) may distinguish the at least one row of the borderless table (103) with the at least one non tabular row using a Long Short-Term Memory (LSTM) (501) based deep learning model for obtaining a table header in the document (101A). Further, the tabular data extraction system (104) may distinguish the at least one row of the borderless table (103) comprising table data with the at least one row comprising the table header using the Long Short-Term Memory (LSTM) (501) based deep learning model in the document (101A). Considering that the table header is distinguishable from the contents of the table, the table header is identified. Furthermore, the tabular data extraction system (104) may determine the at least one row and the first set of document coordinates based on the distinguished at least one row comprising the table data with the at least one row comprising the table header using the Long Short-Term Memory (LSTM) (501) based deep learning model in the document (101A).

In an embodiment, the LSTM (501) based deep learning model may use a set of features for distinguishing the at least one row of the borderless table (103) with the at least one non tabular row and for distinguishing the at least one row of the borderless table (103) comprising table data with the at least one row comprising the table header of the borderless table (103) in the document (101A). The set of features may be extracted from the document (101A).

In some implementation of the LSTM (501), the set of features may include at least one of detecting a space percentage of each row, a horizontal range of text within an individual row, a relative position of the individual row with respect to a previous row, a percentage of special characters in each row, the percentage of numerical characters in each row, the percentage of capital letters in each row, ratio of average height of characters in each row with average height of characters in the page, ratio of average height of characters in each row with average height of characters in the page, and ratio of average width of characters in each row with average width of characters in the page.

In an embodiment, the LSTM (501) is trained with a set of features extracted from a plurality of documents as inputs and the first set of document coordinates as the expected output.

As shown in FIG. 5, the LSTM (501) is a recurrent neural network model with four neural network layers denoted as "S" and "T". A recurrent neural network at instant in time may feed the previous output of the neural network as an input to the neural network. The neural network layers denoted as "S" use a sigmoidal activation function and the output of the neural network layers "S" may be as shown in the below equation:

$$Y_t = f(W * [OUTPUT, INPUT]) \qquad (5)$$

Where Yt denotes the output of the neural network layer "S" at the time instant "t". "f" denotes the sigmoidal activation function and "W" denotes the weights of the neural network layer "S". INPUT denotes the set of features fed to the LSTM (501) as input at the instant "t". OUTPUT denotes a set of outputs generated by the LSTM (501) at the instant "t–1". Further, the neural network layers denoted as "T" use a tan hyperbolic activation function and the output of the neural network layers "T" may be as shown in the below equation:

$$Y_t = f(W * [OUTPUT, INPUT]) \qquad (5)$$

Where Yt denotes the output of the neural network layer "T" at the time instant "t". "f" denotes the tan hyperbolic activation function and "W" denotes the weights of the neural network layer "T". INPUT denotes the set of features fed to the LSTM (501) as input at the instant "t". OUTPUT denotes a set of outputs generated by the LSTM (501) at the instant "t–1". Furthermore, $\otimes$ indicates a pointwise multiplication of an input vectors and indicates a pointwise addition of the input vectors. The "tanh" denotes a tan hyperbolic activation function.

The set outputs generated by the LSTM (501) may be one or more parameters used to distinguish the at least one row of the borderless table (103) with the at least one non tabular row and distinguish the at least one row of the borderless table (103) comprising table data with the at least one row comprising the table header of the borderless table (103) in the document (101A). For example, the one or more parameters may be the first set of document coordinates used for identifying at least one of a row of the borderless table (103), a non-tabular row and the table header of the borderless table (103) in the document (101A).

As shown in FIG. 6A, the tabular data extraction system (104) may receive the document (101A) with a borderless table (103) and the image (101B) of the document (101A). The tabular data extraction system (104) may identify the borderless table (103) in the document (101A) based in the first set of document coordinates generated by the LSTM (501) as shown in FIG. 6B. The tabular data extraction system (104) may distinguish the table header of the borderless table (103) from the at least one row of the borderless table (103) based on the first set of document coordinates generated by the LSTM (501) as shown in FIG. 6C. The tabular data extraction system (104) may determine the first set of document coordinates of at least one row of the borderless table (103) using the LSTM (501) as shown in FIG. 6D.

At the step 305, the tabular data extraction system (104) may determine a second set of document coordinates of the at least one column corresponding to the at least one row, based on the second set of pixel coordinates of the at least one column.

The tabular data extraction system (104) may crop the image of the borderless table (103) from the image (101B) of the document (101A) based on the determined first set of document coordinates generated by the LSTM (501) at the step 304. The image of the borderless table (103) may be cropped using the first set of pixel coordinates generated by converting the first set of document coordinates into first set of pixel coordinates as shown in the FIG. 6E. Further, the tabular data extraction system (104) may identify the second set of pixel coordinates from the cropped image (101B) based on one or more image processing techniques. Furthermore, the tabular data extraction system (104) may convert the second set of pixel coordinates into the second set of document coordinates.

As shown in FIG. 6F, the tabular data extraction system (104) may identify the second set of pixel coordinates from the cropped image (101B) based on one or more image processing techniques. As shown in FIG. 6G, the tabular data extraction system (104) may convert the second set of pixel coordinates into the second set of document coordinates.

Referring back to FIG. 3, at the step 306, the tabular data extraction system (104) may extract the tabular data in the identified borderless table (103) from the document (101A) based on the determined first and second set of document coordinates.

The tabular data extraction system (104) may extract the tabular data in the identified borderless table (103) based on the first and the second set of document coordinates using a text processing library in a sorted format. The extracted tabular data (105) comprises at least one of table header and the table data of the borderless table (103).

Computer System

Figure 7:
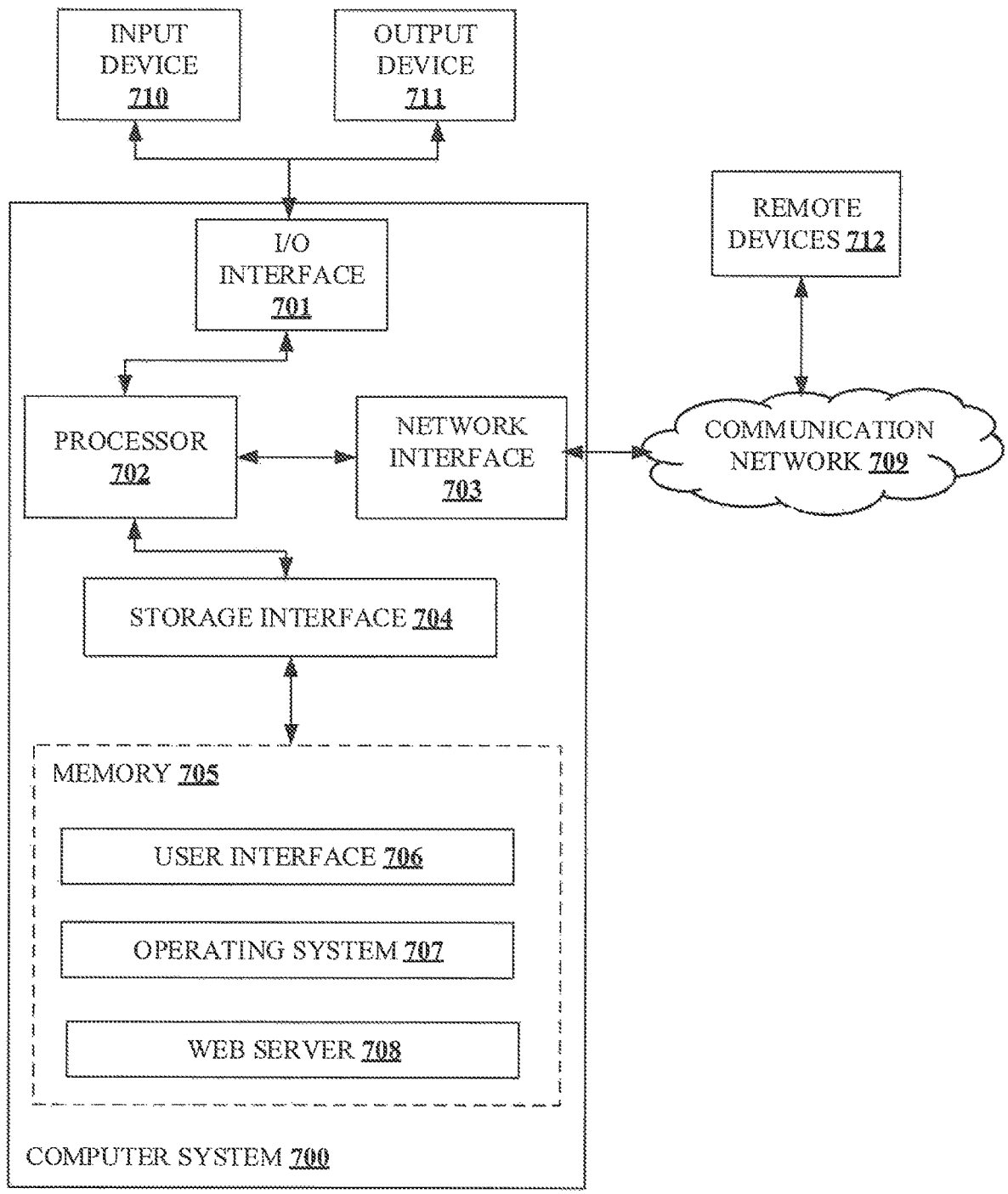
FIG. 7 shows an exemplary computer system for extracting tabular data from a document, in accordance with some embodiments of the present disclosure.

FIG. 7 illustrates a block diagram of an exemplary computer system (700) for implementing embodiments consistent with the present disclosure. In an embodiment, the computer system (700) may be used to implement the method for extracting tabular data from a document (101A). The computer system (700) may comprise a central processing unit ("CPU" or "processor") (702). The processor (702) may comprise at least one data processor for executing program components for dynamic resource allocation at run time. The processor (702) may include specialized processing units such as integrated system (bus) controllers, memory management control units, floating point units, graphics processing units, digital signal processing units, etc.

The processor (702) may be disposed in communication with one or more input/output (I/O) devices (not shown) via I/O interface (701). The I/O interface (701) may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface (701), the computer system (700) may communicate with one or more I/O devices. For example, the input device (710) may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device (711) may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system (700) is connected to the service operator through a communication network (709). The processor (702) may be disposed in communication with the communication network (709) via a network interface (703). The network interface (703) may communicate with the communication network (709). The network interface (703) may employ connection protocols including, without limitation, direct connect, Ethernet (e.g., twisted pair 10/100/1000 Base T), transmission control protocol/Internet protocol (TCP/IP), token ring, IEEE 802.11a/b/g/n/x, etc. The communication network (709) may include, without limitation, a direct interconnection, e-commerce network, a peer to peer (P2P) network, local area network (LAN), wide area network (WAN), wireless network (e.g., using Wireless Application Protocol), the Internet, Wi-Fi, etc. Using the network interface (703) and the communication network (709), the computer system (700) may communicate with the one or more service operators.

In some embodiments, the processor (702) may be disposed in communication with a memory (705) (e.g., RAM, ROM, etc. not shown in FIG. 7 via a storage interface (704). The storage interface (704) may connect to memory (705) including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory (705) may store a collection of program or database components, including, without limitation, user interface (706), an operating system (707), web server (708) etc. In some embodiments, computer system (700) may store user/application data (706), such as the data, variables, records, etc. as described in this disclosure. Such databases may be implemented as fault-tolerant, relational, scalable, secure databases such as Oracle or Sybase.

The operating system (707) may facilitate resource management and operation of the computer system (700). Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM®OS/2®, MICROSOFT® WINDOWS® (XP®, VISTA®/7/8, 10 etc.), APPLE® IOS®, GOOGLE™ ANDROID™, BLACKBERRY® OS, or the like.

In some embodiments, the computer system (700) may implement a web browser (not shown in the Figure) stored program component. The web browser may be a hypertext viewing application, such as MICROSOFT® INTERNET EXPLORER®, GOOGLE™ CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers (708) may utilize facilities such as AJAX, HTML, ADOBE® FLASH®, JAVASCRIPT®, JAVA®, Application Programming Interfaces (APIs), etc. In some embodiments, the computer system (700) may implement a mail server stored program component not shown in the Figure). The mail server may be an Internet mail server such as Microsoft Exchange, or the like. The mail server may utilize facilities such as Active Server Pages (ASP), ACTIVEX®, ANSI® C++/C#, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® Exchange, Post Office Protocol (POP), Simple Mail Transfer Protocol (SMTP), or the like. In some embodiments, the computer system (700) may implement a mail client stored program component not shown in the Figure). The mail client may be a mail viewing application, such as APPLE® MAIL, MICROSOFT® ENTOURAGE®, MICROSOFT® OUTLOOK®, MOZILLA® THUNDERBIRD®, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processors to perform steps or stages consistent with the embodiments described herein. The term "computer-readable medium" should be understood to include tangible items and exclude carrier waves and transient signals, i.e., non-transitory. Examples include Random Access memory (RAM), Read-Only memory (ROM), volatile memory, non-volatile memory, hard drives, Compact Disc (CD) ROMs, Digital Video Disc (DVDs), flash drives, disks, and any other known physical storage media.

In some implementation the document (101A) and the image (101B) of the document (101A) may be received from the remote devices (712).

In light of the above-mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

The method of extracting the tabular data from a document (101A) includes identifying at least one of the bordered table (102) and the borderless table (103). The tabular data extraction system (104) reduces cost and manual labor required for extracting tabular data from fixed format documents.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it may be readily apparent that more than one device/article (whether or not they cooperate) may be used in place of a single device/article. Similarly, where more than one device or article is described herein (whether or not they cooperate), it may be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 3 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments may be apparent to those skilled in the art. The various aspects and embodiments disclosed herein are for purposes of illustration and are not intended to be limiting, with the true scope being indicated by the following claims.

REFERRAL NUMERALS

| Reference number | Description |
| --- | --- |
| 101A | Document |
| 101B | Image |
| 102 | Bordered table |
| 103 | Borderless table |
| 104 | Tabular data extraction system |
| 105 | Extracted tabular data |
| 201 | I/O Interface |
| 202 | Memory |
| 203 | Processor |
| 204 | Data |
| 205 | Pixel coordinates data |
| 206 | Document coordinates data |
| 207 | Other data |
| 208 | Modules |
| 209 | Table identification module |
| 210 | Pixel coordinates identification module |
| 211 | Document coordinates identification module |
| 212 | Conversion module |
| 213 | Data extraction module |

-continued

| Reference number | Description |
| --- | --- |
| 214 | Other module |
| 501 | Long Short Term Memory (LSTM) |
| 700 | Computer System |
| 701 | I/O interface |
| 702 | Processor |
| 703 | Network Interface |
| 704 | Storage Interface |
| 705 | Memory |
| 706 | User Interface |
| 707 | Operating System |
| 708 | Web Server |
| 709 | Communication Network |
| 710 | Input Device |
| 711 | Output Device |
| 712 | Remote Devices |

What is claimed is:

1. A method for extracting tabular data from a document, comprising:

receiving, by a tabular data extraction system, the document and an image of the document, wherein the image comprises a plurality of pixel coordinates;

identifying, by the tabular data extraction system, at least one of a bordered table and a borderless table in the document using the image of the document;

upon identifying the bordered table in the document:
extracting, by the tabular data extraction system, tabular data in the identified bordered table using a first and a second set of pixel coordinates from the plurality of pixel coordinates, wherein the first and the second set of pixel coordinates corresponds to at least one row and at least one column in the image of the document respectively;

upon identifying the borderless table in a page of the document:
determining, by the tabular data extraction system in the document, a first set of document coordinates ("$Y_t$") of at least one row of the borderless table, using a Long Short-Term Memory (LSTM) based deep learning model,
wherein the LSTM based deep learning model uses sigmoidal activation function ("f") to convert the set of features ("INPUTS$_t$") associated with the page into the first set of document coordinates ($Y_t$),
wherein the set of features ("INPUTS") comprises: a space percentage of each row in the page, a horizontal range of text within an individual row, ratio of average height of characters in each row with average height of characters in the page, and ratio of average width of characters in each row with average width of characters in the page associated with the document page, for:
obtaining a table header of the borderless table by distinguishing the at least one row of the borderless table from at least one non-tabular row in the page;
distinguishing the at least one row comprising table content data from the at least one row comprising the table header; and
determining the first set of document coordinates of the at least one row of the borderless table based on the distinguished at least one row comprising the table content data from the at least one row comprising the table header;

determining, by the tabular data extraction system, a second set of document coordinates of the at least one column corresponding to the at least one row, based on the determined first set of document coordinates and the second set of pixel coordinates of the at least one column; and extracting, by the tabular data extraction system, the tabular data in the identified borderless table from the document based on the determined first and second set of document coordinates.

2. The method of claim 1, wherein identifying at least one of the bordered table and the borderless table is based on one or more image processing techniques applied on the image of the document.

3. The method of claim 1 wherein extracting the tabular data in the identified bordered table comprises:
retrieving the first and second set of pixel coordinates of the at least one row and the at least one column of the identified bordered table based on one or more image processing techniques;
converting the first and second set of pixel coordinates into the first and second set of document coordinates; and
extracting the tabular data corresponding to the first and second set of document coordinates in the bordered table from the document using a text processing library in a sorted format.

4. The method of claim 1, wherein determining the second set of document coordinates of the at least one column comprises:
cropping the image of the borderless table from the image of the document based on the determined first set of document coordinates;
identifying the second set of pixel coordinates from the cropped image based on one or more image processing techniques; and
converting the second set of pixel coordinates into the second set of document coordinates.

5. The method of claim 1, wherein extracting the tabular data in the identified borderless table is based on the first and the second set of document coordinates using a text processing library in a sorted format, wherein the extracted tabular data comprises at least one of the table header and the table content data.

6. The method as claimed in claim 1, wherein the first and the second set of document coordinates comprises at least one of one or more distances from a reference point in a page of the document, line numbers in the page of the document and column numbers in the page of the document.

7. The method of claim 1, wherein the first set of document coordinates of at least one row of the borderless table is determined by equation:

$Y_t = f(W^*[OUTPUT_{t-1}, INPUT_t])$

Where
Yt denotes the output of the LSTM based deep learning model at the time instant "t",
"f" denotes the sigmoidal activation function which is an activation function of the LSTM based deep learning model to covert the INPUT to OUTPUT at any time instant, and
"W" denotes weights assigned to each neural network layer defined in the LSTM based deep learning model,
"INPUT" denotes the set of features fed as input to the LSTM based deep learning model at time instant "t", OUTPUT denotes previous state of a set of outputs generated by the LSTM based deep learning model at time instant "t−1".

8. A tabular data extraction system, for extracting tabular data from a document, the tabular data extraction system comprises:
a processor; and
a memory communicatively coupled to the processor, wherein the memory stores the processor executable instructions, which, on execution, causes the processor to:
receive the document and an image of the document, wherein the image comprises a plurality of pixel coordinates;
identify at least one of a bordered table and a borderless table in the document using the image of the document;
upon identifying the bordered table in the document:
extract the tabular data in the identified bordered table using a first and a second set of pixel coordinates from the plurality of pixel coordinates, wherein the first and the second set of pixel coordinates corresponds to at least one row and at least one column in the image of the document respectively;
upon identifying the borderless table in a page of the document:
determine a first set of document coordinates ("$Y_t$") of at least one row of the borderless table using a Long Short-Term Memory (LSTM) based deep learning model,
wherein the LSTM based deep learning model uses sigmoidal activation function ("f") to convert the set of features ("INPUTS$_t$") associated with the page into the first set of document coordinates ($Y_t$),
wherein the set of features ("INPUTS") comprises: a space percentage of each row in the page, a horizontal range of text within an individual row, ratio of average height of characters in each row with average height of characters in the page, and ratio of average width of characters in each row with average width of characters in the page associated with the document page, for:
obtaining a table header of the borderless table by distinguishing the at least one row of the borderless table from at least one non-tabular row in the page;
distinguishing the at least one row comprising table content data from the at least one row comprising the table header; and
determining the first set of document coordinates of the at least one row of the borderless table based on the distinguished at least one row comprising the table content data from the at least one row comprising the table header;
determine a second set of document coordinates of the at least one column corresponding to the at least one row, based on the determined first set of document coordinates and the second set of pixel coordinates of the at least one column; and
extract the tabular data in the identified borderless table from the document based on the determined first and second set of document coordinates.

9. The tabular data extraction system as claimed in claim 8, wherein the processor is configured to identify at least one of the bordered table and the borderless table based on one or more image processing techniques applied on the image of the document.

10. The tabular data extraction system as claimed in claim 8, wherein the processor is configured to extract the tabular data in the identified bordered table comprises:
retrieving the first and second set of pixel coordinates of the at least one row and the at least one column of the identified bordered table based on one or more image processing techniques; converting the first and second set of pixel coordinates into the first and second set of document coordinates; and
extracting the tabular data corresponding to the first and second set of document coordinates in the bordered table from the document using a text processing library in a sorted format.

11. The tabular data extraction system as claimed in claim 8, wherein the processor is configured to determine the second set of document coordinates of the at least one column comprises:
cropping the image of the borderless table from the image of the document based on the determined first set of document coordinates;
identifying the second set of pixel coordinates from the cropped image based on one or more image processing techniques; and
converting the second set of pixel coordinates into the second set of document coordinates.

12. The tabular data extraction system as claimed in claim 8, wherein the processor is configured to extract the tabular data in the identified borderless table based on the first and the second set of document coordinates using a text processing library in a sorted format, wherein the extracted tabular data comprises at least one of the table header and the table content data.

13. The tabular data extraction system as claimed in claim 8, wherein the first and the second set of document coordinates comprises at least one of one or more distances from a reference point in a page of the document, line numbers in the page of the document and column numbers in the page of the document.

14. A non-transitory computer readable medium including instructions stored thereon that when processed by at least one processor cause a device to perform operations comprising:
receiving, by a tabular data extraction system, the document and an image of the document, wherein the image comprises a plurality of pixel coordinates;
identifying, by the tabular data extraction system, at least one of a bordered table and a borderless table in the document using the image of the document;
upon identifying the bordered table in the document:
extracting, by the tabular data extraction system, tabular data in the identified bordered table using a first and a second set of pixel coordinates from the plurality of pixel coordinates, wherein the first and the second set of pixel coordinates corresponds to at least one row and at least one column in the image of the document respectively;
upon identifying the borderless table in a page of the document:
determining, by the tabular data extraction system in the document, a first set of document coordinates ("$Y_t$") of at least one row of the borderless table using a Long Short-Term Memory (LSTM) based deep learning model, wherein the LSTM based deep learning model uses sigmoidal activation function ("f") to convert the set of features ("INPUTS$_t$") associated with the page into the first set of document coordinates ($Y_t$), wherein the set of features ("INPUTS") comprises: a space percentage of each row in the page, a horizontal range of text within an individual row, ratio of average height of characters in each row with average height of characters in the page, and ratio of average width of characters in each row with average width of characters in the page associated with the document page, for:

obtaining a table header of the borderless table by distinguishing the at least one row of the borderless table from at least one non-tabular row in the page;

distinguishing the at least one row comprising table content data from the at least one row comprising the table header; and determining the first set of document coordinates of the at least one row of the borderless table based on the distinguished at least one row comprising the table content data from the at least one row comprising the table header;

determining, by the tabular data extraction system, a second set of document coordinates of the at least one column corresponding to the at least one row, based on the determined first set of document coordinates and the second set of pixel coordinates of the at least one column; and extracting, by the tabular data extraction system, the tabular data in the identified borderless table from the document based on the determined first and second set of document coordinates.

15. The media of claim 14, wherein the instructions cause the processor to identify at least one of the bordered table and the borderless table based on one or more image processing techniques applied on the image of the document.

16. The media of claim 14, wherein the instructions cause the processor to extract the tabular data in the identified bordered table comprising:

retrieving the first and second set of pixel coordinates of the at least one row and the at least one column of the identified bordered table based on one or more image processing techniques;

converting the first and second set of pixel coordinates into the first and second set of document coordinates; and extracting the tabular data corresponding to the first and second set of document coordinates in the bordered table from the document using a text processing library in a sorted format.

17. The media of claim 14, wherein the instructions cause the processor to determine the second set of document coordinates of the at least one column comprising:

cropping the image of the borderless table from the image of the document based on the determined first set of document coordinates;

identifying the second set of pixel coordinates from the cropped image based on one or more image processing techniques; and converting the second set of pixel coordinates into the second set of document coordinates.

18. The media of claim 14, wherein the instructions cause the processor to extract the tabular data in the identified borderless table based on the first and the second set of document coordinates using a text processing library in a sorted format, wherein the extracted tabular data comprises at least one of the table header and the table content data.

\* \* \* \* \*